United States Patent
Armstrong et al.

(10) Patent No.: US 7,949,008 B2
(45) Date of Patent: May 24, 2011

(54) METHOD, APPARATUS AND COMPUTER PROGRAM PRODUCT FOR CELL PHONE SECURITY

(75) Inventors: William Joseph Armstrong, Rochester, MN (US); Richard Louis Arndt, Austin, TX (US); Renato J. Recio, Austin, TX (US); James Walter Rymarczyk, Austin, TX (US); Jacobo A. Vargas, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 1482 days.

(21) Appl. No.: 11/342,952

(22) Filed: Jan. 30, 2006

(65) Prior Publication Data

US 2007/0177611 A1    Aug. 2, 2007

(51) Int. Cl.
*H04J 3/16* (2006.01)
(52) U.S. Cl. .................. 370/465; 370/328; 718/1
(58) Field of Classification Search ............ 370/395.52; 710/28, 23, 26; 712/13, 228; 713/2, 170
See application file for complete search history.

(56) References Cited

U.S. PATENT DOCUMENTS

| | | | | |
|---|---|---|---|---|
| 6,247,109 | B1 * | 6/2001 | Kleinsorge et al. | 712/13 |
| 6,859,867 | B1 | 2/2005 | Berry | |
| 7,275,028 | B2 * | 9/2007 | Traut | 703/23 |
| 2004/0205272 | A1 * | 10/2004 | Armstrong et al. | 710/260 |
| 2005/0228993 | A1 * | 10/2005 | Silvester et al. | 713/168 |
| 2006/0136911 | A1 * | 6/2006 | Robinson et al. | 718/1 |
| 2006/0265521 | A1 | 11/2006 | Boyd | |
| 2006/0265522 | A1 | 11/2006 | Boyd | |
| 2006/0265525 | A1 | 11/2006 | Boyd | |
| 2006/0265561 | A1 | 11/2006 | Boyd | |
| 2006/0288125 | A1 | 12/2006 | Boyd | |
| 2007/0005815 | A1 | 1/2007 | Boyd | |
| 2007/0050591 | A1 | 3/2007 | Boyd | |
| 2007/0050763 | A1 * | 3/2007 | Kagan et al. | 718/1 |
| 2007/0106986 | A1 * | 5/2007 | Worley | 718/1 |
| 2007/0136458 | A1 | 6/2007 | Boyd | |
| 2007/0198656 | A1 * | 8/2007 | Mazzaferri et al. | 709/218 |

* cited by examiner

*Primary Examiner* — Michael J Moore, Jr.
(74) *Attorney, Agent, or Firm* — Anthony VS England; Libby Z. Toub

(57) ABSTRACT

An audio application program is isolated from an Internet application program in a cell phone system having a processor. An operating system program, a partition manager process and the audio and Internet application programs are stored in a computer readable memory of the cell phone. The method includes executing the partition manager process, the audio application program and the Internet application program by the cell phone system processor. Executing the partition manager process includes the partition manager process controlling the audio application program executing to be associated with a first executing instance of the cell phone operating system and the Internet application program executing to be associated with a second executing instance of the cell phone operating system, so that the audio application program is isolated from the Internet application program.

20 Claims, 10 Drawing Sheets

METHOD, APPARATUS AND COMPUTER PROGRAM PRODUCT FOR CELL PHONE SECURITY

BACKGROUND

1. Field of the Invention

The present invention concerns security for Internet connected cell phones and, more particularly, concerns isolating applications in such cell phones.

2. Description of Related Art

Cell phones have become part of everyday life. While their main purpose is to enable voice communication, new features are transforming cell phones into multipurpose devices. With every new feature, dependence on cell phones increases. A camera is an increasingly popular feature. Games are also revolutionizing cell phone usage.

These emerging applications have taken data storage and Internet transmission and to a new level. Images captured with a cell phone's camera can be sent as e-mail or transferred directly to a computer as files. Games can now be downloaded to store and run on a cell phone, or else the cell phone can be used to play games over an Internet connection. Depending on the game, this may also require storing related data on the phone's memory.

These developments present the same security issues and vulnerabilities for cell phones that have long affected more conventional, Internet-connected computing devices. That is, private information of cell phone users is threatened. Malicious code may compromise a cell phone's functioning. Processed digital content such as movies and music may be subject to theft.

SUMMARY OF THE INVENTION

The present invention addresses the foregoing problem. According to a method form of the invention, an audio application program is isolated from an Internet application program in a cell phone system having a processor. An operating system program, a partition manager process and the audio and Internet application programs are stored in a computer readable memory of the cell phone. The method includes executing the partition manager process, the audio application program and the Internet application program by the cell phone system processor. Executing the partition manager process includes the partition manager process controlling the audio application program executing to be associated with a first executing instance of the cell phone operating system and the Internet application program executing to be associated with a second executing instance of the cell phone operating system, so that the audio application program is isolated from the Internet application program.

In another aspect, the partition manager process includes a hypervisor, and executing the partition manager process includes partitioning the cell phone system into logical partitions by the hypervisor process. The operating systems instances execute in respective ones of the logical partitions. The hypervisor provides services to instances of the operating systems, wherein the operating system instances access hardware resources of the cell phone system via the hypervisor process.

In another aspect, executing the partition manager process includes allocating respective portions of the cell phone memory to the respective operating system instances and their associated application programs. Also, the executing partition manager process limits cell phone memory accesses are limited to the respective operating system instances and limits the cell phone memory accesses of the respective operating system instances to their respectively allocated portions of the cell phone memory.

In another aspect, executing the partition manager process includes associating data sets with the respective operating system instances and their associated application programs, wherein the associations persist in a nonvolatile, computer readable memory after terminating the execution of the respective operating system instances. Also, the executing partition manager process limits accesses of the operating system instances and their associated application programs to the respectively associated data sets.

In another aspect, executing the partition manager process includes associating interrupts with the respective operating system instances and their associated application programs. Also, the executing partition manager process limits processing of interrupts by the operating system instances and their associated application programs to processing of the respectively associated interrupts.

In another aspect, executing the partition manager process includes associating input and output operations with the respective operating system instances and their associated application programs. Also, the executing partition manager process limits processing of input and output operations by the operating system instances and their associated application programs to processing of the respectively associated input and output operations.

In another aspect, the method includes receiving the operating system program securely by a trusted computing module of the cell phone via a secure network protocol, so that the secure receiving of the operating system program and the isolating of the respective images of the operating system provide trusted virtual system images.

In another aspect, the receiving by the trusted computing module via the secure network protocol includes authenticating, authorizing and decrypting.

In another aspect, the trusted computing module authenticates the operating system and application at power-on cycles.

In another aspect, the authenticating includes traversing instructions of the operating system program, calculating a signature and comparing the signature to a reference.

In another aspect, the method includes configuring operation of the operating system images by an operating system image management process of the partition manager process running on the cell phone, wherein the configuring is responsive to user input via an interface driven by the operating system image management process.

In another aspect, the operating system image management process provides each operating system with a default set of applications that will execute on that operating system.

In another form of the invention, a method providing a service for isolating application programs in a user's cell phone system having a processor includes sending an operating system program securely to a trusted computing module of the user's cell phone via a secure network protocol for storing in a computer readable memory of the cell phone. The cell phone system processor runs a partition manager process for associating first and second executing instances of the cell phone operating system with respective application programs to provide an isolation function for the cell phone. The operating system instances are trusted and the application programs associated with the respective operating system instances are isolated from one another. A fee is charged for the isolation function.

In another aspect, providing the service includes connecting servers of a service provider to the operating systems by respective network connections.

According to a computer program product form of the invention, application programs are isolated in a cell phone system having a processor. The computer program product has instructions stored on a computer-readable medium and the instructions include instructions for receiving an operating system program securely by a trusted computing module of the cell phone via a secure network protocol. The instructions also include partition manager instructions for executing by the cell phone system processor for associating first and second executing instances of the cell phone operating system with respective application programs to provide an isolation function for the cell phone. The operating system instances are trusted and the application programs associated with the respective operating system instances are isolated from one another.

Other variations, objects, advantages, and forms of the invention will become apparent upon reading the following detailed description and upon reference to the accompanying drawings.

BRIEF DESCRIPTION OF THE DRAWINGS

The foregoing and other objects, aspects and advantages will be better understood from the following detailed description of a preferred embodiment(s) of the invention with reference to the accompanying drawings. The same reference numbers are used throughout the FIG's to reference like components and features. In the drawings.

DETAILED DESCRIPTION OF PREFERRED EMBODIMENTS OF THE INVENTION

In the following detailed description of the preferred embodiments, reference is made to the accompanying drawings illustrating embodiments in which the invention may be practiced. It should be understood that other embodiments may be utilized and changes may be made without departing from the scope of the present invention. The drawings and detailed description are not intended to limit the invention to the particular form disclosed. On the contrary, the intention is to cover all modifications, equivalents and alternatives falling within the spirit and scope of the present invention as defined by the appended claims. Headings herein are not intended to limit the subject matter in any way.

Overview

Figure 1A:
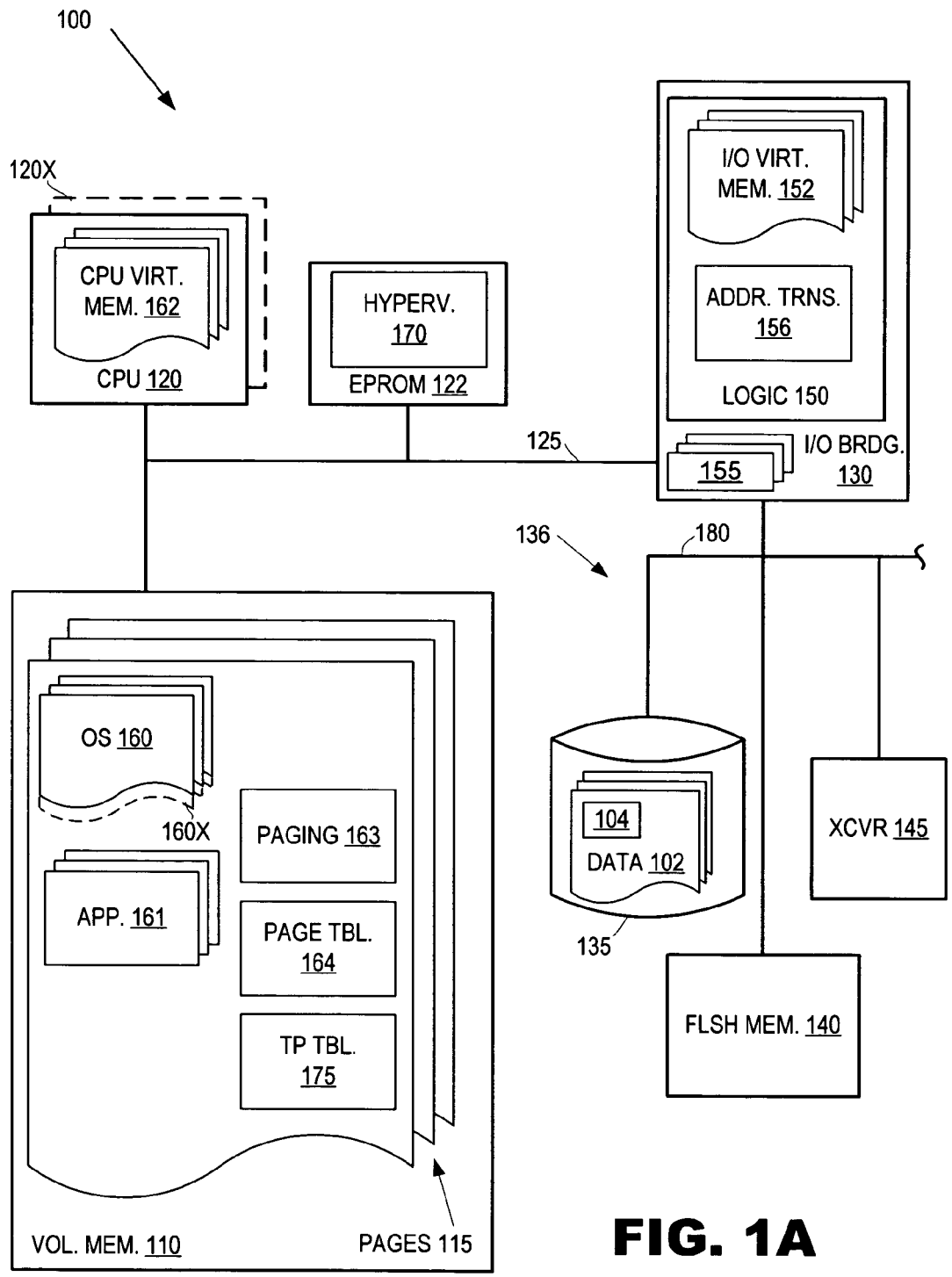
FIG. 1A illustrates certain aspects of a cell phone, according to an embodiment of the present invention.

Referring now to FIG. 1A, a cell phone 100 is shown, according to an embodiment. In cell phone 100, instructions for a hypervisor 170, which is a form of a "partition manager," are stored in erasable programmable read only memory 122, which is a form of computer readable, nonvolatile memory. Additionally, blocks 104 of data 102 are stored in additional nonvolatile memory 135. (Herein, the term "data" is generally used to include instructions, unless clearly indicated otherwise from the context.) Hypervisor 170, executing on central processing unit ("CPU") 120, writes data 102 from nonvolatile memory 135 to volatile memory 110 when needed. Data 102 is accessible from volatile memory 110 by CPU 102 and I/O devices 135, 140, 145, etc. of cell phone 100. As used herein, the term "I/O device" refers to any of a variety of devices which interface to cell phone 100 and provide information to or receive information from cell phone 100. Examples of I/O devices include a user-removable memory, such as flash memory 140, which is another form of nonvolatile memory, a wireless transceiver 145, and other devices (not shown) such as a key pad, a camera, a microphone, an audio speaker, etc.

I/O devices 135, etc. are coupled to I/O bus 180, which is, in turn, coupled via I/O bridge 130 to system bus 125. I/O logic 150, which may include an I/O processor, arbitrates among I/O devices 135, etc., that is, grants I/O devices 135, etc. access one-at-a-time to I/O bus 180, and to first bus 125 via I/O bus 180. I/O bridge 130 also has I/O data buffers 155, for caching data 102 from memory 110 or an I/O device, responsive to requests by I/O devices 135, etc. Logic 150 includes logic that handles the data buffering.

In the embodiment of the invention illustrated, data 102 includes operating system instructions 160, which run on CPU 120 with the support of firmware 170, and application instructions 161, which run on CPU 120 with the support of hypervisor 170 and operating system 160. In FIG. 1A, operating system instructions 160 that are executing as instances in CPU 120, i.e., "images," are shown as "operating system 160" loaded in volatile memory 110. Likewise, application instructions 161 that are executing in CPU 120 are shown as applications 161 loaded in volatile memory 110. Likewise, it should be understood that hypervisor 170 may also be loaded into volatile memory 110. In the embodiment, hypervisor 170 runs on processor 120 substantially independently of operating system 160, and provides a lower level of interface and therefore greater access to and control of hardware components, such as processor 120, than does operating system 160.

A set of program instructions executable by processor 120 and stored in memory 122, 110, 135, 140 etc. is also known as a "software program" implement various embodiments of a software program in accordance with the present invention. Such embodiments of the invention may implement the one or more software programs in various ways, including procedure-based techniques, component-based techniques, and/or object-oriented techniques, among others. Specific examples include XML, C, C++ objects, Java and commercial class libraries. Those of ordinary skill in the art will appreciate that the hardware depicted herein may vary depending on the implementation. For example, other peripheral devices may be used in addition to or in place of the hardware depicted. The depicted example is not meant to imply architectural limitations with respect to the present invention. For example, in another embodiment of the invention, I/O devices of cell phone 100 may be on the same bus 125 as CPU 120, rather than on a separate I/O bus 180. Also, it should be understood that cell phone 100, as shown, may be implemented in a single integrated circuit chip or multiple chips.

Isolation of Applications

Figure 1B:
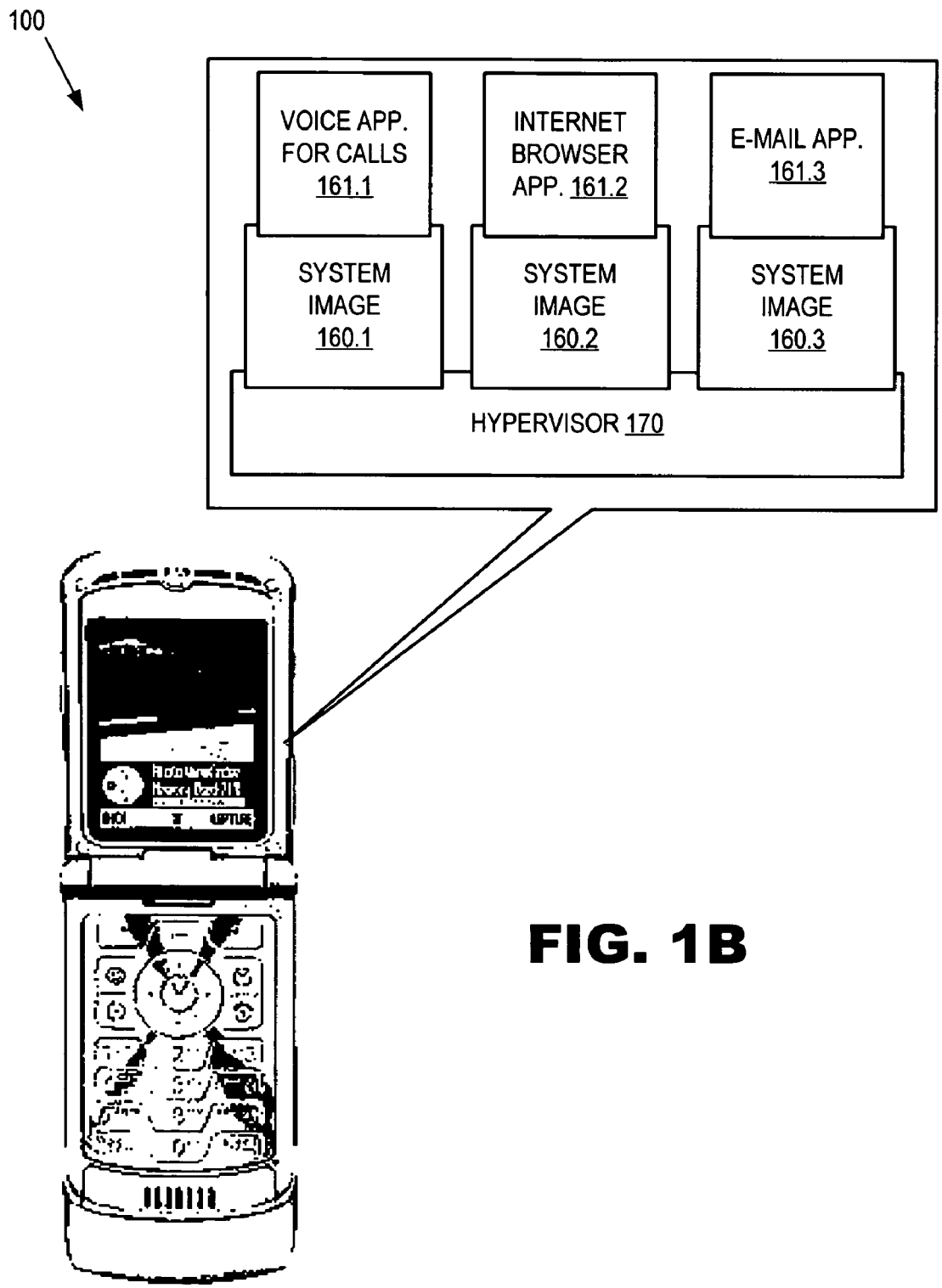
FIG. 1B illustrates certain aspects of cell phone operation, according to an embodiment of the present invention

In a number of embodiments of the invention, software applications, or sets of software applications, are isolated from one another by running each application 161, or set of applications, on its own respective operating system image. Referring now to FIG. 1B, an embodiment of the invention is shown in which audio application 161.1, e.g., for conventional telephone communication, runs on one operating system image 160.1, first Internet related application 161.2, i.e., a browser, runs on another operating system image 160.2, and another Internet related application 161.3, i.e., an e-mail application, runs on another operating system image 160.3. (It should be understood that more than one application 161 may run on each operating system instance 160, although only one application 161 is shown with each operating system image 160 in the illustrated instance.) It is advantageous that if one of the browser Internet application 160.2, for example, downloads a hack that causes it to crash, the isolation of application 160.2 from applications 160.1 and 160.3 and by means of hypervisor 170 and operating system images 160.1, 160.2 and 160.3 prevents audio application 160.2 from also crashing.

This isolation of software applications 161 from one another is accomplished in at least three different ways in different embodiments of the invention. "Virtualization" is one way of sharing a processor among multiple operating system instances. Referring again to FIG. 1A, in a first embodiment of the invention, one type of virtualization is employed in which hypervisor process 170 provides services at a firmware level to instances of one or more operating systems. That is, the operating systems 160 access hardware resources of the system via the hypervisor. The addition of hypervisor 170 enables operating systems 160 and their respective software applications 161 to share a processor 120 without changes to the hardware, operating systems 160 or software applications 161. In a second embodiment of the invention, another type of virtualization is employed in which instead of employing a stand alone hypervisor 170, code 160X is added to and interfaced with one or more standard operating system 160 in order to provide similar functionality, enabling the sharing of processor 120 among multiple instances of the operating system or systems 160. In this case, the operating systems 160 access hardware resources of the system via services provided by the new code 160X. In a third embodiment of the invention, at least one separate processor 120X is dedicated to run at least one other instance of operating system 160. The addition of certain code enables this third arrangement, either with or without changing operating system 160 or software applications 161. In other words, the added code may be part of operating system 160, as is code 160X, or may be independent, as is hypervisor 170. In the third arrangement, a single processor is not shared by multiple operating system images. The hypervisor of the above described first embodiment is referred to herein as a partition manger. Likewise, in the above described second and third embodiments the invention, the new code is also referred to herein as a partition manger.

Protecting Memory

Referring now to FIGS. 1A and 1B, in an aspect of the above described isolation, hypervisor, i.e., partition manager, 170 controls volatile memory 110 assignments and protects nonvolatile memory 122, 135, 140, etc. This advantageously permits a software application 161, to alter only a portion of memory 110, etc. that is associated with the same application 161. Stated another way, partition manager 170 permits only the respective operating system instances 160.1, 160.2 and 160.3 to access cell phone memory 110, etc. via the partition manager 170, and limits cell phone memory 110, etc. accesses of respective operating system instances 160.1, 160.2 and 160.3 to their respectively allocated portions of phone memory 110, etc. . . . This prevents a software application 161.1, for example, from altering any portion of memory 110, etc. associated with some application 161.2, 161.3, etc., other than application 161.1 itself. Likewise, this advantageously prevents an application 161.2, for example, from using the operating system 160.2 of application 160.2 to erase memory 110, 122, 135, 140, etc. Thus operating system images 160.1, 160.2 and 160.3 and applications 161.1, 161.2 and 161.3 are isolated from one another.

Receiving and Installing Operating System Images

Figure 2A:
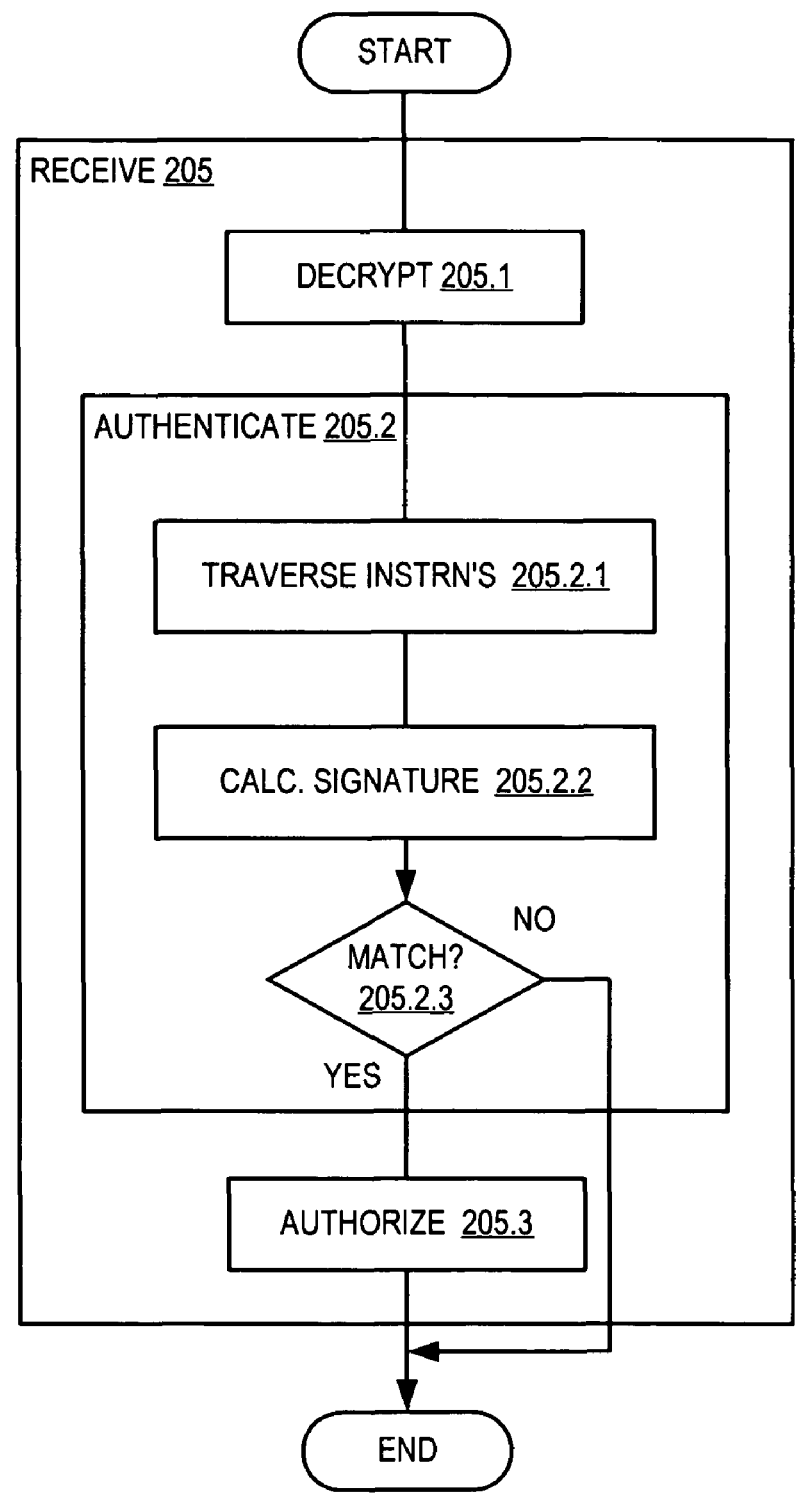
FIG. 2A illustrates certain aspects of a process for receiving an operating system image, according to an embodiment of the present invention.

Referring now to FIG. 2A, certain aspects of a receiving process 201 are illustrated, according to an embodiment of the present invention. According to the illustrated embodiment of the invention, a trusted computing module of an operating system image management process for the cell phone receives 205 the operating system program securely via a secure network protocol. The operating system image management process may also receive in this manner, and provide for each received operating system, a default set of applications that will execute on that operating system. As part of this receiving process, the trusted computing module decrypts 205.1, authenticates 205.2 and authorizes 205.3 operation of the received operating system. Also, at power-on cycles the trusted computing module authenticates 205.2 the operating system and applications associated with respective operating system images. This authenticating includes traversing 205.2.1 instructions of the operating system program, calculating 205.2.2 a signature and comparing the signature 205.2.3 to a reference. This secure receiving of the operating system program and isolating of the respective images of the operating system provides trusted virtual system images.

Figure 2B:
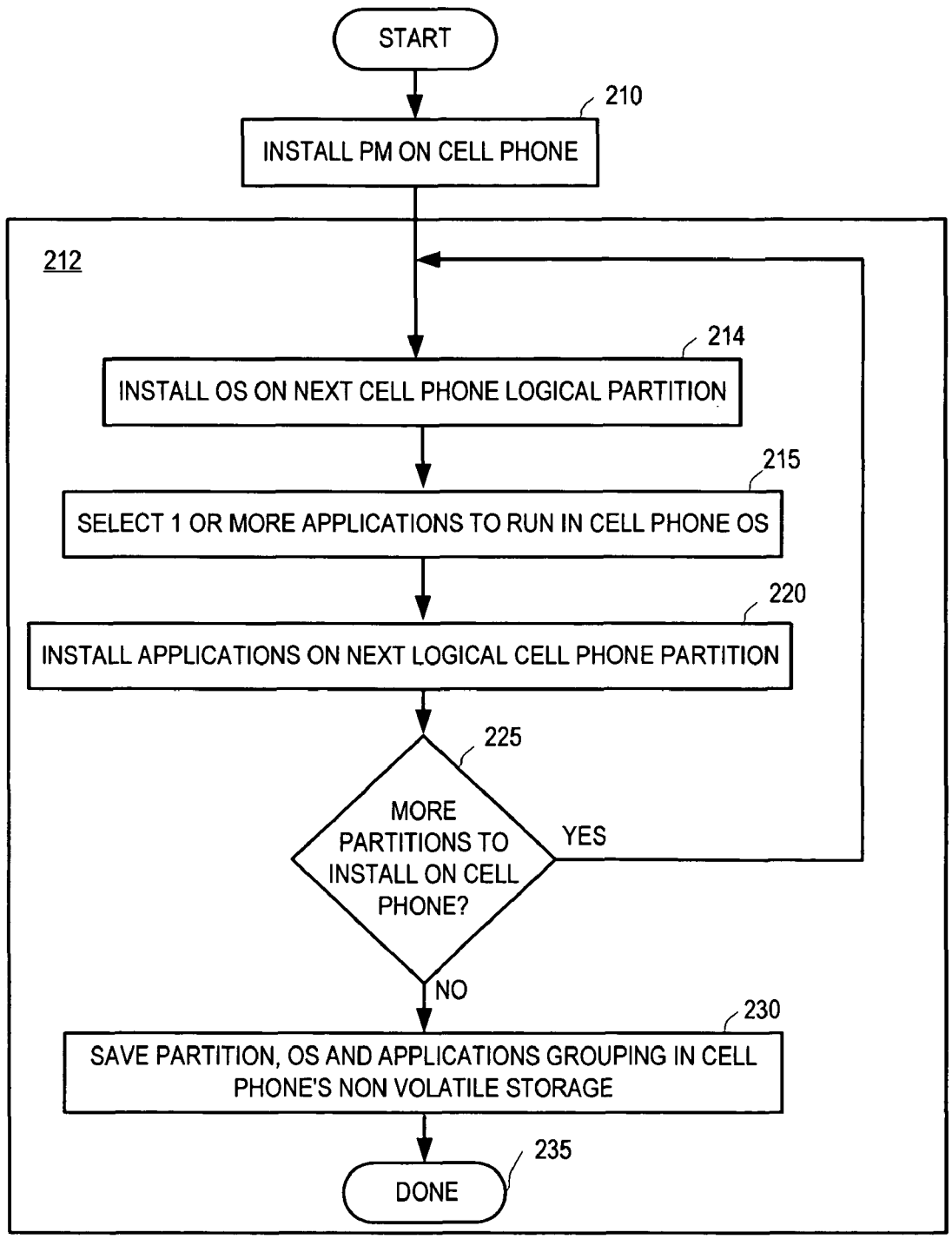
FIG. 2B illustrates certain aspects of a process for installing operating system images, according to an embodiment of the present invention.

Referring now to FIG. 2B, certain aspects of an initialization process 212 of a partition manager for initially installing operating system images are illustrated in a flow chart, which includes certain features relating to nonvolatile memory control, according to an embodiment of the present invention. The installing may be initiated by an administrator such as a cell phone manufacturer or a cell phone service provider, for example. After beginning, the administrator installs 210 a partition manager on a cell phone. Then an installation subprocess 212 installs 214 a first operating system instance on a first logical partition. Then the administrator selects 215 a set of one or more applications to run in association with the first operating system instance and subprocess 212 installs 220 the selected application set on the first logical partition. Next, at 225, subprocess 212 determines whether the installer wants to install another partition. If yes, then 214 through 220 are repeated for second logical partition, operating system instance and set of applications, and succeeding ones, as well, until subprocess 212 determines 225 that the installer does not want to install another partition.

Once subprocess 212 determines 225 the installer does not want to install another partition, subprocess 212 branches to saving 230, in the cell phone's nonvolatile memory, indicia of the number and size of partitions and of associated operating system instances and associations among the configured applications and the operating system instance. Likewise, indicia is saved in nonvolatile memory for input and output operations and interrupts associated with the respective operating system instances and their respective application programs. Thus, processing by the operating system instances and their associated application programs of input and output operations and interrupts is limited to processing of the respectively associated input and output operations and interrupts. Subprocess 212 then ends at 235.

Operating System Image Management

Figure 3:
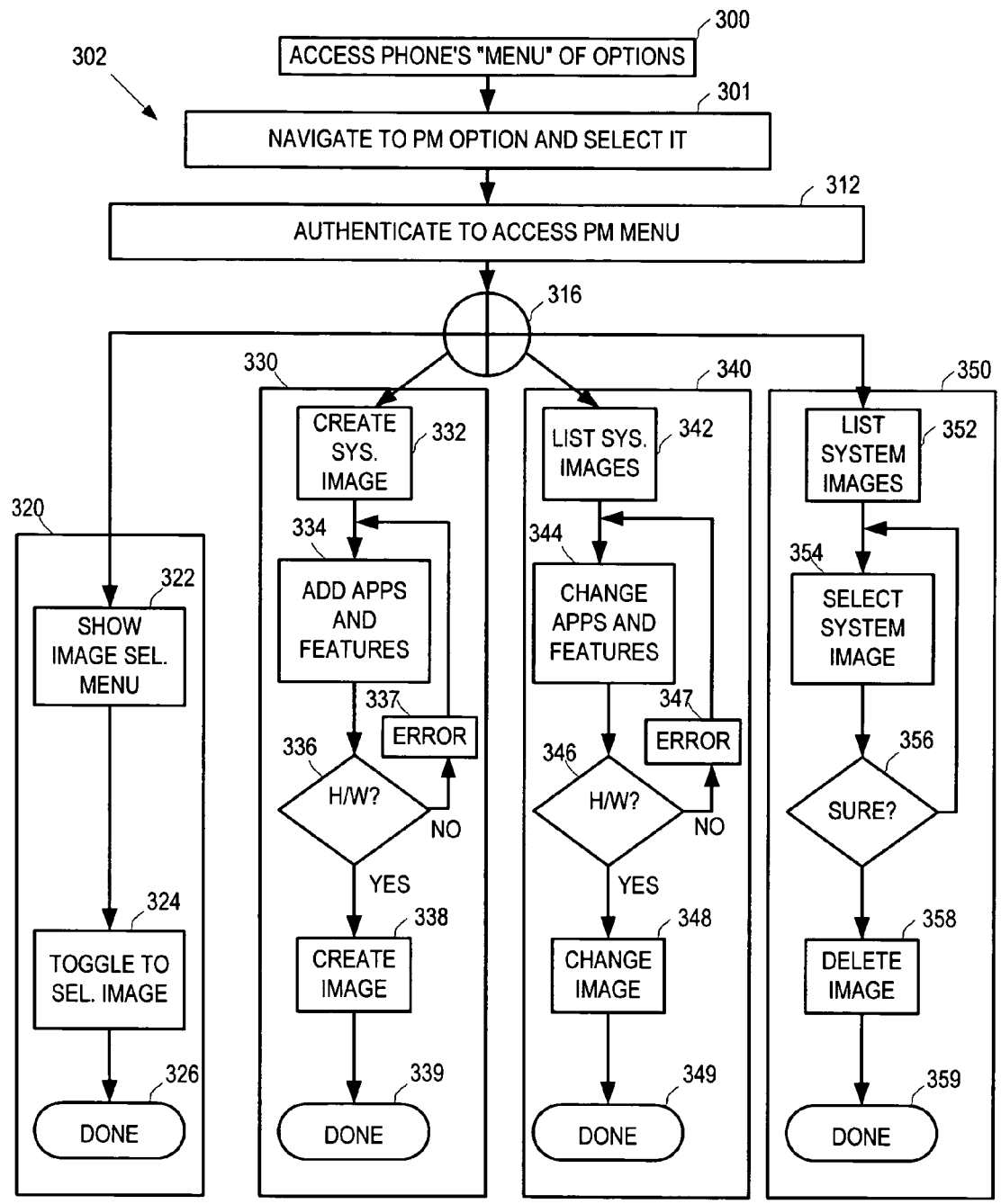
FIG. 3 illustrates certain aspects of a partition manager subprocess for managing operating system images, according to an embodiment of the present invention.

Referring now to FIG. 3, certain aspects are illustrated for an operating system image management subprocess 302 of the partition manager that runs on the cell phone of FIG. 1 after initial installation described above, according to an embodiment of the present invention. At an initial user display, a top level menu process presents 300 the user with a top level icon for selecting to access a user menu. Although other processes may also be chosen at the top level, only an operating system image management subprocess 302 is illustrated and described herein. Responsive to user selection 301 of system image management subprocess 302, subprocess 302 drives an interface for communicating with the user and executes authentication 312 to determine if and how the user may continue in menu 302. According to the illustrated embodiment of the invention, this authenticates 312 the user's authorization to continue by recognizing a phrase spoken by the user or a user entered keypad sequence.

If authentication 312 indicates the user is fully authorized, such as would be the case for service personnel, then subprocess 302 presents 316 a menu item on the user display having choices for four subprocesses, as shown, namely, toggle system image subprocess 320, create system image subprocess 330, edit system image subprocess 340 and remove system image subprocess 350. If authentication 312 indicates the user is authorized but, not authorized for access to privileged subprocesses 330, 340 and 350, such as would be the case for an end user, then subprocess 302 presents 316 the user only sub-process 320 for toggling among system images.

Responsive to user selection of subprocess 320, subprocess 320 presents 322 the user with an image selection menu that lists executing operating system instances and applications for running in association with the respective operating system images. Alternatively, the user may have assigned a name to an operating system image and its associated application or set of applications, in which case merely the name may be displayed. Responsive to user selection 324 of one of the listed operating system images and its associated set of applications, subprocess 320 runs the selected operating system image and its applications. It should be understood that this is one way a user may toggle between sets of applications. For example, one set of applications associated with one operating system image may all require Internet access, another application may be a calendar, etc. Or one application associated with one operating system image may be for one Internet related function, such as e-mail, another application associated with another operating system image may be for another Internet related function, such as browsing, etc.

Turning now to another subprocess, responsive to user selection of subprocess 330, subprocess 330 creates 332 a new operating system instance, and then presents choices of applications and features to the user and responsive to the user choices attempts to add 334 applications and features to the operating system instance. Subprocess 330 checks 336 for adequate hardware resource availability responsive to an attempt to add 334. If inadequate, then subprocess 330 generates 337 a error message and branches back to again present choices to the user for attempting to add 334 applications and features to the operating system instance. If adequate, then subprocess 330 initiates execution 338 of the application instances, which may include saving, in cell phone nonvolatile memory, indicia of i) the operating system instance and ii) the association of the operating system instance with the selected applications, I/O devices, interrupts, I/O operations. (It should be understood that an I/O devices may be by more than one operating system image and its associated application or applications. For example, if one operating system image is for a browser application and another is for e-mail, both may use a wireless transceiver I/O device. The present invention virtualizes the transceiver, so that memory associated with the transceiver and one application is kept separate from memory associated with the other application.) Then subprocess 330 ends 339.

Turning now to another subprocess, responsive to user selection of subprocess 340, subprocess 340 presents 342 a list of the operating system instances for the user to select among. Responsive to the user selecting one of the operating system images, subprocess 340 attempts to add or remove 344 applications and features for the selected operating system instance. Subprocess 340 checks 346 for adequate hardware resource availability responsive to an attempt to add 344 an application or feature. If inadequate, then subprocess 340 generates 347 a error message and branches back to again present choices to the user for attempting to add or remove 344 applications and features to the operating system instance. If adequate, then subprocess 340 initiates execution 348 of the changed application instances, which may include saving, in cell phone nonvolatile memory, updated indicia of i) the operating system instance and ii) the association of the operating system instance with the selected applications, I/O devices, interrupts, I/O operations. Subprocess 340 then ends 349.

Turning now to another subprocess, responsive to user selection of subprocess 350 for removal of an operating system image, subprocess 350 presents 352 a list of the operating system instances for the user to select among. Responsive to the user selecting one of the operating system images, subprocess 350 prompts 356 the user to confirm the intended removal. If the user confirms, subprocess 350 deletes 358 the selected operating system instance, which may include saving in cell phone memory updated i) indicia of the operating system instance and ii) the association of the operating system instance with the selected applications, I/O devices, interrupts, I/O operations. Subprocess 350 then ends 359.

Booting

Figure 4:
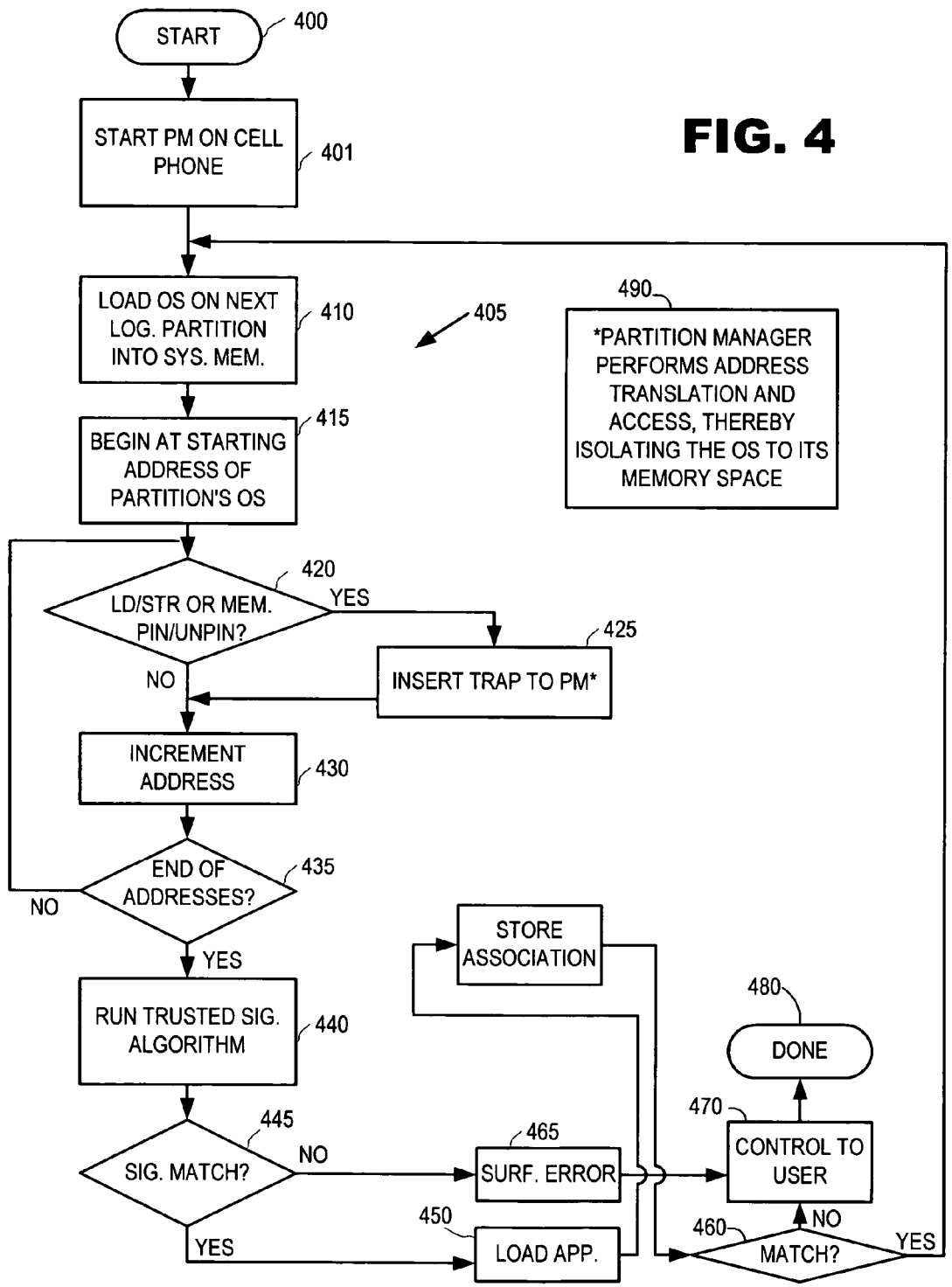
FIG. 4 illustrates a partition manager boot subprocess, according to an embodiment of the present invention.

Referring now to FIG. 4, certain aspects are illustrated of booting the partition manager, which, in turn boots, operating systems and applications, according to an embodiment of the present invention. At 401 a boot or reboot event occurs, such as power on or a user action such as pressing and holding a particular button on the cell phone or selecting a particular menu item. This starts 401 a boot subprocess 405 of the partition manager, which is in EPROM and may read a configuration file stored in the cell phone's nonvolatile memory that includes indicia of the number and size of partitions and of associated operating system instances and associations among the configured applications and the operating system instance. Responsive to this event and this information, subprocess 405 initiates loading 410 of a first operating system instance on a first logical partition in volatile system memory without passing control to the operating system instance. This includes subprocess 405 first assigning address space in volatile memory for the operating system instance subprocess 405 then initializes 415 a pointer to the starting address in the volatile system memory for the partition's operating system instance, examines 420 system memory and determines whether the memory at the address to which the pointer currently points is a privileged operation, e.g., a load or a store operation or a memory pin or unpin operation.

If examining 420 system memory determines the memory at the address is one of the particular types of operations, then subprocess 405 inserts a trap instruction at that location to cause the operating system instance to pass control to the partition manager. In this manner, if the trap instruction is encountered during execution of the operating system instance, a trap subprocess 490 of the partition manager translates the target address of the operation i.e., the load, store, memory pin, memory unpin, etc., and checks to see if the operating system instance is associated with, and therefore authorized to access, the particular memory location at that target address. Additional details of subprocess 490 are described herein below.

If examining 420 system memory determines the memory at the address is not one of the particular types of operations, then subprocess 405 increments 430 the pointer to a next address. subprocess 405 then checks 435 the address to see whether it is the last address location allocated to the operating system instance.

If checking 435 indicates the address is not the last address location allocated to the operating system instance, then subprocess 405 once again examines 420 system and once again determines whether the memory at the address to which the pointer currently points is a load or a store operation, a privileged operation, or a memory pin or unpin operation, and so on. If checking 435 indicates the address is the last address location allocated, then subprocess 405 runs 440 a trusted computing signature algorithm on the current operating system instance, which produces a certain signature, and compares 445 the resulting signature to a predetermined, expected signature.

If the signatures do not sufficiently match, subprocess 405 presents 465 an error message to the user on the cell phone display. If the signatures do sufficiently match, subprocess 405 i) loads 450 the one or more applications that have been associated with the current operating system instance, which may be determined such as by reading a configuration file, ii) stores 455, in memory accessible only to the partition manager, indicia of a set of pages associated exclusively with the current operating system instance, and iii) checks 460 to see whether any additional partitions are available on the cell phone, which may include again reading the configuration file or reading information therefrom that was previously obtained at 401.

If checking 460 indicates additional partitions are not available on the cell phone, boot subprocess 405 passes 470 control to the user and ends 480. If checking 460 indicates additional partitions are available, boot subprocess 405 branches back and loads 410 a next operating system instance on a next logical partition in system memory without passing control to the operating system instance, and so on, until all partitions and, correspondingly, all operating system instances are booted.

Virtual Memory

Referring again to FIG. 1A, in an embodiment of the invention, volatile memory 110 includes more memory locations than processor 120 can address directly. Consequently, cell phone 100 includes a mechanism for mapping memory 110 as virtual memory. The fact that memory 110 is larger than processor 120 can address directly is not an absolutely necessary consequence of running multiple instances of an operating system. However, the two issues are not entirely unrelated. There is a trend to running more applications in cell phones that is partly due to the appeal of applications for browsing the Internet and downloading or playing music, video and games from the Internet. This tends to not only demand more memory 110, but also a need for improved security. Further, Internet linkage complicates the security task. This complication is one motivating factor that led to development of the embodiment of the present invention, wherein applications are isolated for security purposes by running on multiple operating system images using services of a partition manger.

As concerns their actual physical location in volatile memory 110, blocks 104 of data 102 are referred to as "physical pages" 115 of data, to distinguish from references to data 102 having the viewpoint of virtual memory mapping. Volatile memory 110 is therefore also sometimes referred to as "physical memory."

In certain respects, an instance of operating system 160 presents to CPU 120, and a set of associated applications running thereon, a view of blocks 104 of data 102 as pages 115 of virtual memory, so that the actual location of data 102 is fairly transparent, regardless of whether the data is in volatile memory 110 or nonvolatile memory 135, for example. This view of virtual memory is illustrated in FIG. 1A figuratively as CPU virtual memory 162. In the embodiment illustrated, Hypervisor 170 provides numerous services relating to this, including services for keeping a page table 164 updated and maintaining memory coherency. Operating system 160 instances use page table 164 via respective paging mechanisms 163 for somewhat transparently moving data 102 in and out of volatile memory 110.

Likewise, each operating system 160 instance directs I/O logic 150 to map blocks 104 of data 102 to physical pages 115 via entries in a translation protection ("TP") table 175, thereby providing each I/O device a view of data 102 as pages 115 of virtual memory. This view of virtual memory is illustrated in FIG. 1A figuratively as I/O virtual memory 152. In the embodiment illustrated, Hypervisor 170 provides numerous services relating to this, including keeping TP table 175 updated and maintaining memory coherency.

To understand TP table 175, consider that I/O devices 135, 140 and 145 (collectively referred to as I/O devices 136) each have their own view of data 102 as pages of virtual memory 152, similar to the virtual memory 162 view of operating system 160 instances. Hypervisor 170 presents this view to I/O devices 136. To maintain this view, the entries (not shown in FIG. 1A) in TP table 175 map blocks 104 of data 102 to I/O virtual memory pages 152. Accordingly, I/O devices 136 may refer to data 102 by reference to virtual page 152 regardless of the actual location of data 102, that is, regardless of which physical page 115 may be currently storing data 102.

Memory requests come to I/O logic 150 on bus 180 from I/O devices 136 with virtual addresses to reflect I/O device virtual memory 152. Address translation logic 156 of I/O logic 150 effectively accesses TP Table 175 (which is kept in I/O device virtual page order) to determine the physical page address that it should apply to bus 125 in order to access the correct physical page 115 associated with the memory request. (Above, the term "effectively" is used because logic 150, in reality, contains cached copies (not shown) of the relevant sections of the TP table 175 so that the process is sped up.)

Figure 5:
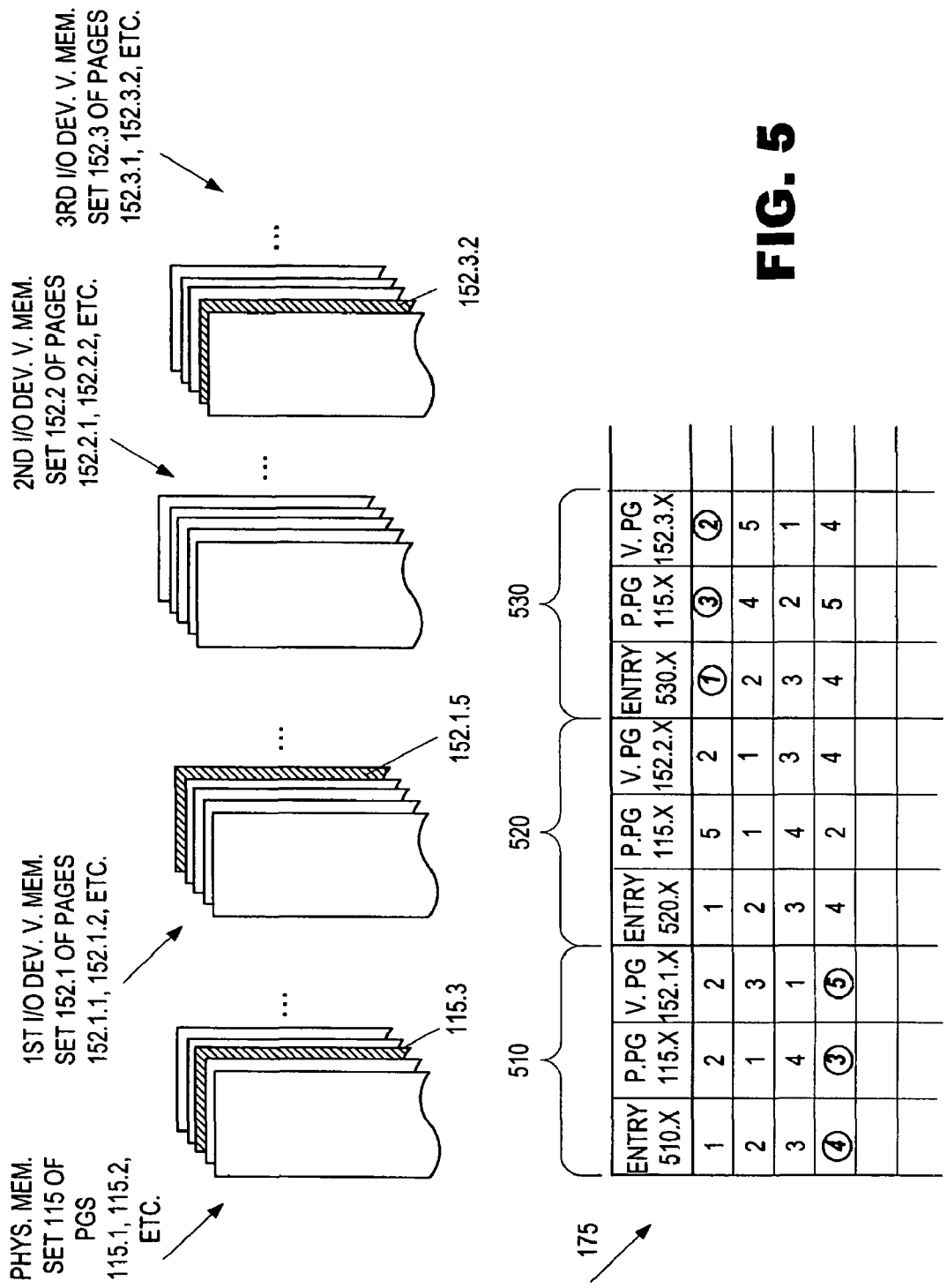
FIG. 5 illustrates additional details of certain memory aspects of the system, according to an embodiment of the present invention.

Referring now to FIG. 5 in connection with FIG. 1A, TP table 175 and a number of physical pages 115 and I/O virtual memory pages 152 are shown in more detail, according to an embodiment. Specifically, as shown in FIG. 5, individual ones of physical pages 115 may be referred to as 115.1, 115.2, etc. Virtual memory pages 152 are shown from the viewpoint of respective I/O devices 136. That is, a first set of pages 152.1 is for a first one of I/O devices 136, e.g., disk 135, a second set of pages 152.2 is for a second one of I/O device 136, e.g., device 140, and a third set 152.3 is shown for a third one of I/O devices 136, e.g., 145, etc.

The sections 510, 520, 530, etc. and specific entries 510.1, 510.2, etc. in each section are shown for TP table 175. These sections correspond to respective first, second, etc. I/O devices, e.g. devices 135, 140, etc. In this manner the section in table 175 in which an entry 500 is located indicates the I/O device which may access the physical page corresponding to that entry. In the example illustrated, targeted physical page 115.3 is viewed by the first I/O device as virtual memory page 152.1.5, while it is viewed by the third I/O device as virtual memory page 152.3.2. Based on the lack of entries in second section 520 of table 175 for page 115.3, Hypervisor 170 determines that the second I/O device has no mapping to page 115.3. That is, page 115.3 is not subject to access by the second I/O device.

Summarizing the above, Hypervisor 170 identifies I/O devices 136 that may access a page such as page 115.3, for example and those that may not, which is equally important, particularly in the context of the present invention. Hypervisor 170 does this by finding entries for physical page 115.3 in table 175. Specifically, in the example of FIG. 5 and with reference also to FIG. 1A, Hypervisor 170 determines that first I/O device 135 and third I/O device 145 may access page 115.3.

Memory Pinning and Unpinning

Blocks of memory subject to access by I/O devices are conventionally "pinned," that is, exempted from being moved. This is because access to them is maintained by essentially endless I/O programs that run as long as the operating system runs and it is disruptive to processor 120 to stop such an I/O program.

Figure 6:
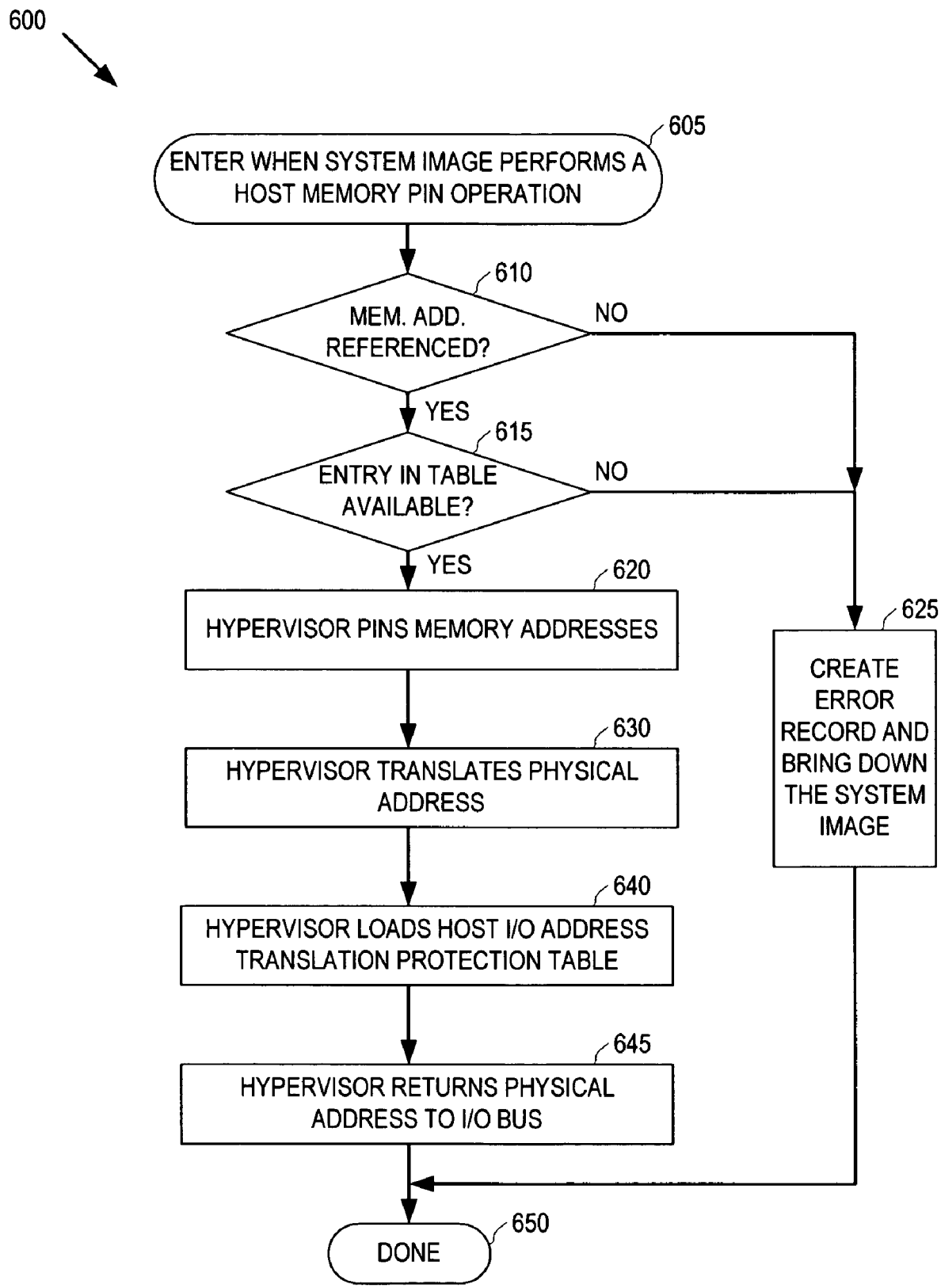
FIG. 6 illustrates certain aspects of pinning memory, according to an embodiment of the present invention.

Referring now to FIG. 6, certain aspects are illustrated regarding pinning of memory 110 by a subprocess 600 of the above mentioned partition manager trap subprocess 490 (FIG. 4), according to an embodiment of the present invention. If a trap instruction is encountered during execution of an operating system instance, control passes to trap subprocess 490 of the partition manager, as previously mentioned. If subprocess 490 responsively determines that the operating system is requesting a host memory pin operation of a physical memory address, subprocess 490 invokes 605 subprocess 600, which then checks 610 to see if the operating system instance is associated with, and therefore authorized to access, the particular physical address targeted by the pin operation. (The association was established 455 (FIG. 4) by boot subprocess 405 (FIG. 4) and a record is kept thereof as described herein above.)

If the operating system instance is not associated, then subprocess 600 creates an error record, shuts down 625 the operating system image, and exits 650. If the operating system instance is associated, then subprocess 600 pins 620 the memory addresses referenced in the memory pin operation, translates the physical address targeted by the pin operation into a real address, i.e., an address that system memory 110 sees, and an I/O bus address, i.e., an address that an I/O adapter sees. Next, subprocess 600 loads 640 an entry for the pinned memory into the TP table and returns 645 the physical address to I/O bus address mapping to the operating system. Finally, subprocess 600 exits.

Figure 7:
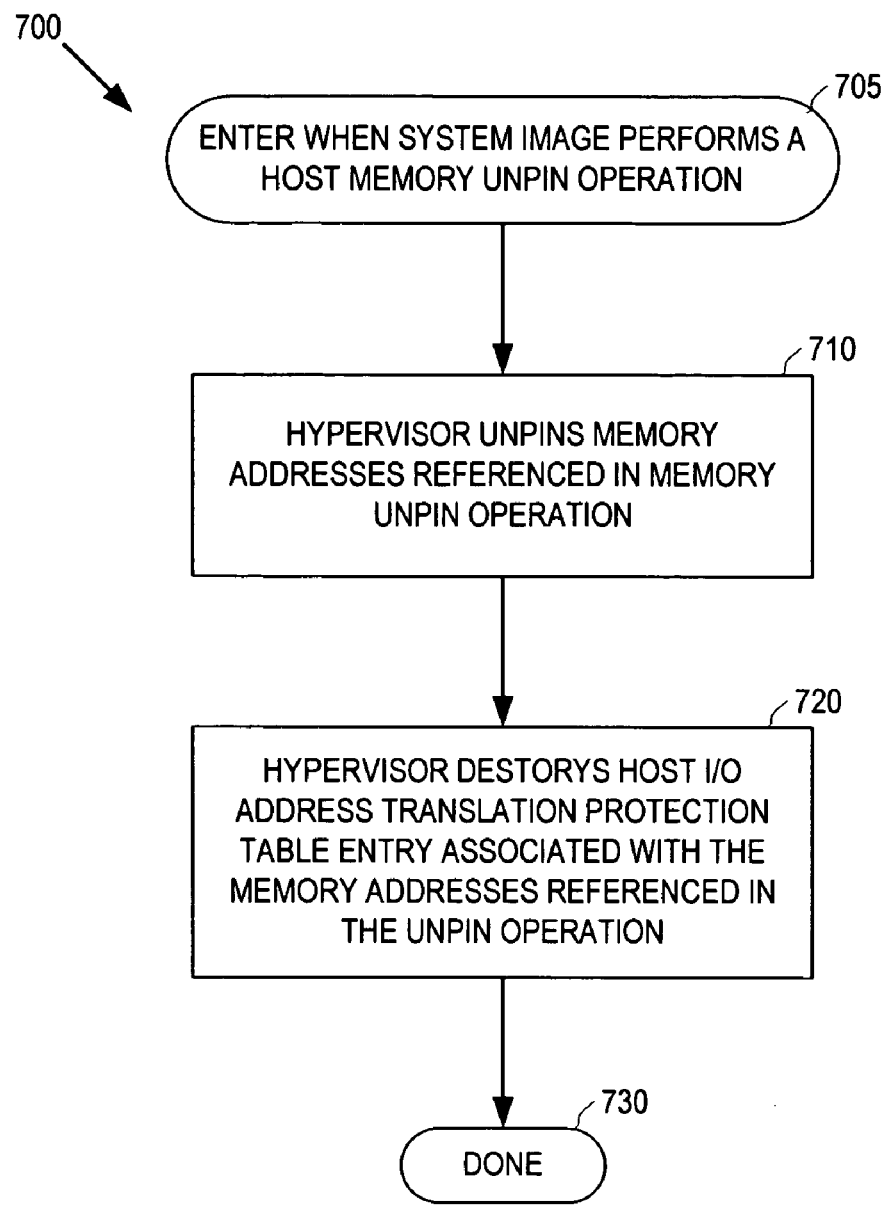
FIG. 7 illustrates certain aspects of unpinning memory, according to an embodiment of the present invention.

Referring now to FIG. 7, certain aspects are illustrated regarding unpinning of memory 110 by a subprocess 700 of the above mentioned partition manager trap subprocess 490 (FIG. 4), according to an embodiment of the present invention. If a trap instruction is encountered during execution of an operating system instance, control passes to trap subprocess 490 of the partition manager, as previously mentioned. If subprocess 490 responsively determines that the operating system is requesting a host memory unpin operation of a physical memory address, subprocess 490 invokes 705 subprocess 700, which then unpins 710 the targeted memory. Next, subprocess 700 deletes the entry in TP table that indicated association of the physical memory to the operating system instance and I/O device.

Service Feature

Figure 8:
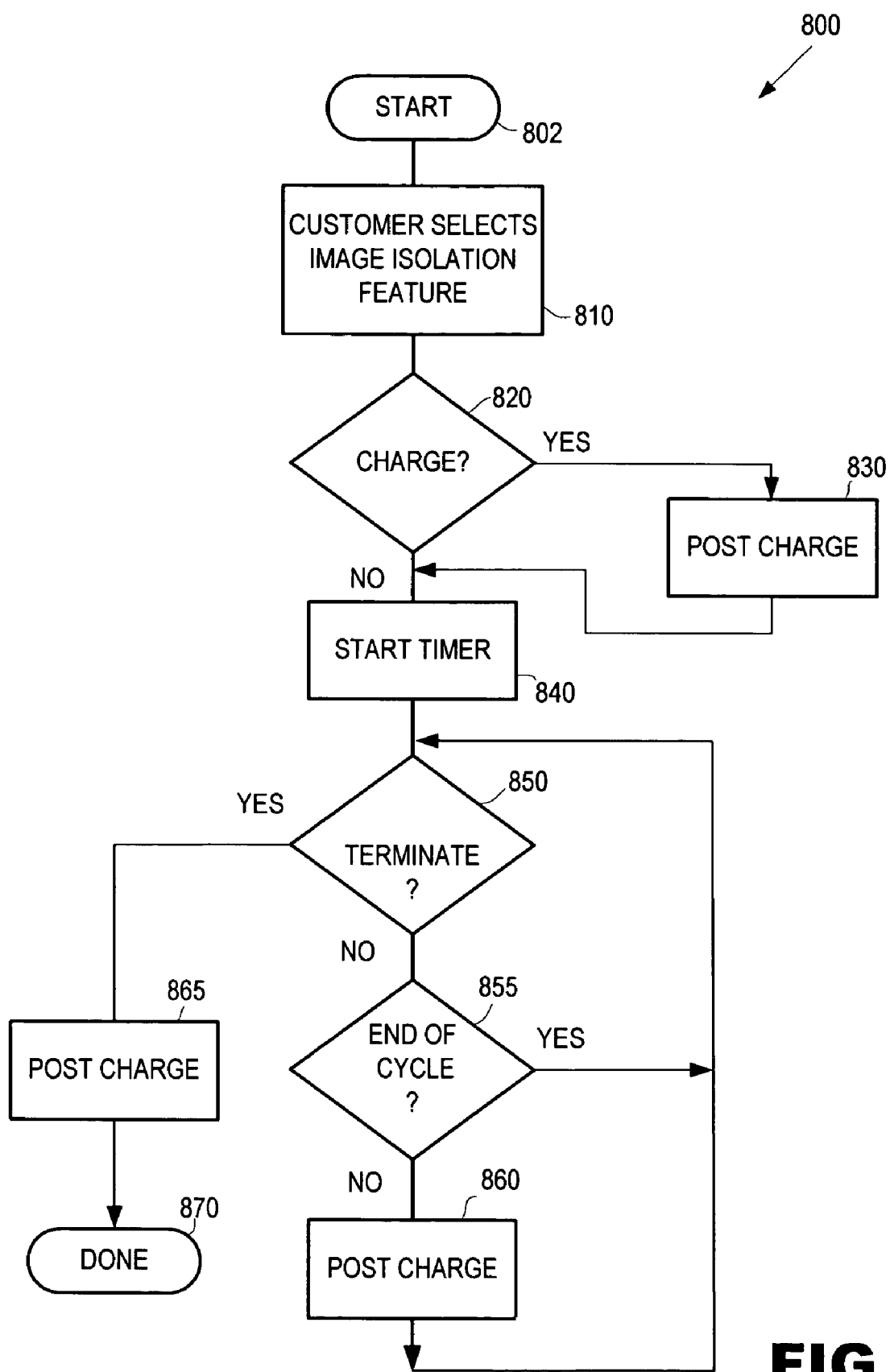
FIG. 8 illustrates certain aspects of a process for providing a partition manager service for a cell phone, according to an embodiment of the present invention.

FIG. 8 illustrates certain aspects of a process 800 for providing a partition manager service for a cell phone, according to an embodiment of the present invention. Process 800 begins at 802, such as responsive to a customer selection of an initial menu item on the customer's cell phone, the customer's Internet connected home computer, or a computer kiosk, for example, responsive to which the cell phone, home computer, kiosk, etc. presents to the customer a set of feature offerings for the customer to select among, including an image isolation feature for the customer's cell phone for providing a security service according to features described herein above.

Responsive to customer selection 810 of the image isolation feature, process 800 determines 820 whether the service provider has an installation or configuration charge for the selected feature. If yes, process 800 posts 830 a charge to the customer's account and proceeds to start 840 a monthly cycle timer. Otherwise, process 800 proceeds directly to start 840 the monthly cycle timer.

Process 800 then monitors from time to time and determines if a request has been received to terminate 850 the image isolation service. If yes, process 800 posts 865 a charge for a partial month and exits 870. If no, process 800 determines 855 whether the monthly cycle has ended. If yes, process 800 posts 860 a service charge for a whole month, which may include resetting a timer or flag, and returns to monitoring for a terminate 850 request and monitoring of the monthly cycle timer 855, etc.

It should be understood that the service offering may include sending the operating system program securely to a trusted computing module of the user's cell phone via a secure network protocol for storing in a computer readable memory of the cell phone, etc. as described herein above in connection with FIG. 2A. The service may include connecting servers of a service provider to the operating system images by respective network connections.

Miscellaneous Remarks and Other Variations

Note that herein above a device, such as cell phone, home computer system, computer kiosk, etc., is described as presenting a user with information. It should be understood that this may include setting out the information visually on a display of the device or audibly by means of a speaker on the device headphone connected thereto, for example.

Note that herein above a device, such as cell phone, home computer system, computer kiosk, etc., is described as "determining" this or that. It should be understood that this may include reading information from a configuration file or database record stored on computer readable media, which may be on the user device itself or on a remote device, and comparing the information with a present state of the user device, a user selection, other event, etc. This may also include reading status of a flag, timer, etc. and comparing it to some predetermined information stored in a configuration file or database record stored on computer readable media.

Herein above it has been described that applications and memory are "associated" with operating instances, and data sets are "associated data" with respective operating system instances or application programs, etc. It should be understood that these associations may be stored by writing in computer readable media, and may be in a data structure such as a configuration file, database record, register, or the like, and that in appropriate cases the associations persist after terminating the execution of the respective operating system instances.

The description of the present embodiment has been presented for purposes of illustration, but is not intended to be exhaustive or to limit the invention to the form disclosed. Many modifications and variations will be apparent to those of ordinary skill in the art. For example, it should be understood that while the present invention has been described in the context of a cell phone having a processor, it should be understood that aspects of the cell phone, including the processor, may be implemented as application-specific integrated circuitry. Accordingly, the term "processor" as used herein should be understood to include application-specific integrated circuitry. Moreover, the processes of the present invention are capable of being distributed in the form of a computer readable medium of instructions. Such computer readable medium may have a variety of forms. The present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The terms "logic" and "memory" are used herein. It should be understood that these terms refer to circuitry that is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention.

Unless clearly and explicitly stated, the claims that follow are not intended to imply any particular sequence of actions. The inclusion of labels, such as a), b), c) etc., for portions of the claims does not, by itself, imply any particular sequence, but rather is merely to facilitate reference to the portions.

What is claimed is:

1. A method of isolating an audio application program from an Internet application program in a cell phone system having a processor, wherein an operating system program, a partition manager process and the audio and Internet application programs are stored in a recordable-type computer readable memory of the cell phone, the method comprising:
    executing the partition manager process by the cell phone system processor;
    executing the audio application program by the cell phone system processor; and
    executing the Internet application program by the cell phone system processor, wherein executing the partition manager process includes:
        the partition manager process controlling the audio application program executing to be associated with a first executing instance of the cell phone operating system and the Internet application program executing to be associated with a second executing instance of the cell phone operating system, so that the audio application program is isolated from the Internet application program; and
    translating a target address targeted by a privileged operation instruction, wherein the translating is responsive to one of the operating system instances executing a trap instruction for the privileged operation instruction, wherein the translating provides a target address for the cell phone system processor to access a volatile memory location; and
    executing the partition manager process includes:
        shutting down the one of the operating system instances instead of accessing the volatile memory location if the one of the operating system instances is not associated with the volatile memory location for the translated target address.

2. The method of claim 1, wherein executing the partition manager process includes:
    allocating respective portions of the cell phone memory to the respective operating system instances and their associated application programs;
    limiting cell phone memory accesses to the respective operating system instances; and
    limiting the cell phone memory accesses of the respective operating system instances to their respectively allocated portions of the cell phone memory.

3. The method of claim 1, wherein executing the partition manager process includes:
    associating data sets with the respective operating system instances and their associated application programs, wherein the associations persist in a nonvolatile, recordable-type computer readable memory after terminating the execution of the respective operating system instances;
    limiting accesses of the operating system instances and their associated application programs to the respectively associated data sets.

4. The method of claim 1, wherein executing the partition manager process includes:
associating interrupts with the respective operating system instances and their associated application programs; and
limiting processing of interrupts by the operating system instances and their associated application programs to processing of the respectively associated interrupts.

5. The method of claim 1, wherein executing the partition manager process includes:
associating input and output operations with the respective operating system instances and their associated application programs; and
limiting processing of input and output operations by the operating system instances and their associated application programs to processing of the respectively associated input and output operations.

6. The method of claim 1 including receiving the operating system program securely by a trusted computing module of the cell phone via a secure network protocol, so that the secure receiving of the operating system program and the isolating of the respective images of the operating system provide trusted virtual system images.

7. The method of claim 6, wherein the receiving by the trusted computing module via the secure network protocol includes authenticating, authorizing and decrypting.

8. The method of claim 7, wherein the trusted computing module authenticates the operating system and application at power-on cycles.

9. The method of claim 7, wherein the authenticating includes traversing instructions of the operating system program stored in a recordable-type computer readable medium, calculating a signature and comparing the signature to a reference.

10. The method of claim 1, including:
configuring operation of the operating system images by an operating system image management process of the partition manager process running on the cell phone, wherein the configuring is responsive to user input via an interface driven by the operating system image management process.

11. The method of claim 10, wherein the operating system image management process provides each operating system with a default set of applications that will execute on that operating system.

12. A computer program product for isolating application programs in a cell phone system having a processor, wherein the computer program product has instructions stored on a computer-readable storage device for controlling the processor, the processor being operative to execute instructions of the program to implement a method, and wherein the instructions include:
instructions for receiving an operating system program securely by a trusted computing module of the cell phone via a secure network protocol; and
partition manager instructions for executing by the cell phone system processor for associating first and second executing instances of the cell phone operating system with respective application programs to provide an isolation function for the cell phone, wherein the operating system instances are trusted and the application programs associated with the respective operating system instances are isolated from one another; and
translating a target address targeted by a privileged operation instruction, wherein the translating is responsive to one of the operating system instances executing a trap instruction for the privileged operation instruction, wherein the translating provides a target address for the cell phone system processor to access a volatile memory location; and
executing the partition manager process includes:
shutting down the one of the operating system instances instead of accessing the volatile memory location if the one of the operating system instances is not associated with the volatile memory location for the translated target address.

13. The computer program product of claim 12, wherein the partition manager instructions include:
instructions for a hypervisor process;
instructions for partitioning the cell phone system into logical partitions by the hypervisor process, wherein the operating systems instances execute in respective ones of the logical partitions; and
instructions for providing services to instances of the operating systems by the hypervisor process, wherein the operating system instances access hardware resources of the cell phone system via the hypervisor process.

14. The computer program product of claim 12, wherein the partition manager instructions include:
instructions for allocating respective portions of the cell phone memory to the respective operating system instances and their associated application programs;
instructions for limiting cell phone memory accesses to the respective operating system instances; and
instructions for limiting the cell phone memory accesses of the respective operating system instances to their respectively allocated portions of the cell phone memory.

15. The computer program product of claim 12, wherein the partition manager instructions include:
instructions for associating data sets with the respective operating system instances and their associated application programs, wherein the associations persist in a non-volatile, recordable-type computer readable memory after terminating the execution of the respective operating system instances;
instructions for limiting accesses of the operating system instances and their associated application programs to the respectively associated data sets.

16. The computer program product of claim 12, wherein the partition manager instructions include:
instructions for associating interrupts and input and output operations with the respective operating system instances and their associated application programs; and
instructions for limiting processing of interrupts and input and output operations by the operating system instances and their associated application programs to processing of the respectively associated interrupts and input and output operations.

17. The computer program product of claim 12, wherein the instructions for receiving by the trusted computing module via the secure network protocol include instructions for authenticating, authorizing and decrypting.

18. A computer system comprising:
a processor; and
a recordable-type computer readable memory connected to the processor, wherein the memory has stored thereon an application isolation program for controlling the processor, and wherein the processor is operative to execute instructions of the program to implement a method comprising:
executing the partition manager process by the cell phone system processor;
executing the audio application program by the cell phone system processor; and executing the Internet application program by the cell phone system processor, wherein executing the partition manager process includes:
  the partition manager process controlling the audio application program executing to be associated with a first executing instance of the cell phone operating system and the Internet application program executing to be associated with a second executing instance of the cell phone operating system, so that the audio application program is isolated from the Internet application program; and
  translating a target address targeted by a privileged operation instruction, wherein the translating is responsive to one of the operating system instances executing a trap instruction for the privileged operation instruction, wherein the translating provides a target address for the cell phone system processor to access a volatile memory location; and
  executing the partition manager process includes:
    shutting down the one of the operating system instances instead of accessing the volatile memory location if the one of the operating system instances is not associated with the volatile memory location for the translated target address.

19. The method of claim 1, comprising:
translating the target address into an I/O device address corresponding to the volatile memory location and loading an entry into a translation protection table if the one of the operating system instances is associated with the volatile memory location at the translated target address, wherein the entry includes one address for the processor to access the volatile memory location and another address for the I/O device to access the volatile memory location.

20. The system of claim 18, comprising:
the partition manager process booting the operating system instances, wherein the booting includes:
  initiating loading of the operating system instances into address spaces assigned to the operating system instances in volatile memory;
  inserting trap instructions for respective privileged operation instructions in the volatile memory address spaces of the operating system instances; and
  passing control to the operating system instances after the inserting.

\* \* \* \* \*